United States Patent [19]

Yamanaga et al.

[11] Patent Number: 4,506,441
[45] Date of Patent: Mar. 26, 1985

[54] WORKPIECE ATTACHING AND DETACHING APPARATUS

[75] Inventors: Junichi Yamanaga, Fujimi; Shiro Naito, Hidaka, both of Japan

[73] Assignee: Honda Giken Kogyo Kabushiki Kaisha, Tokyo, Japan

[21] Appl. No.: 535,954

[22] Filed: Sep. 26, 1983

[51] Int. Cl.³ .............................................. B23P 21/00
[52] U.S. Cl. ...................................... 29/787; 29/33 P
[58] Field of Search ............... 198/358, 472, 647, 648; 29/33 P, 787

[56] References Cited

U.S. PATENT DOCUMENTS

| | | | |
|---|---|---|---|
| 2,982,004 | 5/1961 | Cross | 29/33 P |
| 3,931,882 | 1/1976 | Ossbahr | 198/648 |
| 4,291,797 | 9/1981 | Ewertowski | 29/33 P |
| 4,309,600 | 1/1982 | Perry et al. | 29/33 P |
| 4,343,073 | 8/1982 | Brems | 29/33 P |
| 4,373,840 | 2/1983 | Miller | 198/472 |
| 4,456,418 | 6/1984 | Harter et al. | 29/33 P |

Primary Examiner—Howard N. Goldberg
Assistant Examiner—Steven Nichols
Attorney, Agent, or Firm—Armstrong, Nikaido, Marmelstein & Kubovcik

[57] ABSTRACT

Workpiece attaching and detaching apparatus comprising a supporting column having on one side of the periphery thereof a first station for a pallet to be charged or discharged, and on another side thereof a second station for a workpiece to be charged or discharged. Annular rails are attached to the column surrounding the same. Plural heads are supported on the rails. An indexing device is provided for selecting a desired one of the heads and moving the selected head between its first working position opposite the first station and its second working position located opposite the second station. Each of the heads is provided with both a holding mechanism for the workpiece and a device for operating fasteners on the pallet.

8 Claims, 5 Drawing Figures

WORKPIECE ATTACHING AND DETACHING APPARATUS

BACKGROUND OF THE INVENTION

The present invention relates to a workpiece attaching and detaching apparatus for use in a transfer type working apparatus. Transfer type working apparatuses convey a workpiece along a conveying line so that it may be successively worked upon by one or more working tools disposed along the line. The workpiece is generally mounted on a pallet. The workpiece is attached to the pallet at the beginning of the line, by a fastening means provided on the pallet. At the terminal end of the line, the workpiece is detached by unfastening the fastening means. The present invention is provided for attaching and detaching the workpiece.

It has been usual with this kind of apparatus that a transfer means for effecting a transfer of a workpiece between a first station for the pallet to be charged or discharged and a second station for the workpiece to be charged or discharged, and a fastening-and-unfastening means for the fastening means provided on the pallet are provided separately one from another. When the workpiece is intended to be attached to the pallet, the workpiece may be transferred by the transfer means from the second station to the pallet at the first station. Thereafter the fastening-and-unfastening means is moved from its stand-by position to its operative position located opposite to the first station for effecting the fastening operation. When the workpiece is intended to be detached from the pallet, and fastening means is unfastened by the fastening-and-unfastening means at the first station. Thereafter the workpiece unfastened and resting on the pallet is transferred to the second station by the transfer means. This conventional type apparatus, however, has various inconveniences as described below.

(i) For preventions of mutual operative interference between the transfer means and the fastening-and-unfastening means, it is necessary that before the fastening-and-unfastening means is operated for attaching the workpiece to the pallet, the transfer means is retreated towards the second station. Thus, a waiting time for the retreating operation of the transfer means is needed. Consequently, there is caused a lowering in working efficiency by the waiting time.

(ii) When the workpiece to be attached or detached is changed from one type to a different type which is different from the other in respective engageable positions to be engaged for fastening, by the respective fastening members, it is necessary that the old fastening-and-unfastening means be removed from the attaching and detaching apparatus and in place thereof a new one corresponding to the new workpiece is attached thereto. Thus, the operation of replacing thereof is troublesome.

OBJECT AND SUMMARY OF THE INVENTION

This invention has for its object to provide an apparatus free from those inconveniences.

The invention is characterized in that the apparatus comprises a supporting column having on one side of the periphery thereof a first station for a pallet to be charged or discharged and on another side thereof a second station for a workpiece to be charged or discharged, an annular rail means attached to the supporting column so as to surround the same, plural heads supported on the annular rail means, and an index means for selecting any desired one of the heads and moving the selected one between its first working position located opposite the first station and its second working position located opposite the second station, and each of the heads is provided with both a holding means for the workpiece and a fastening and unfastening means for a fastening means on the pallet.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figure 1:
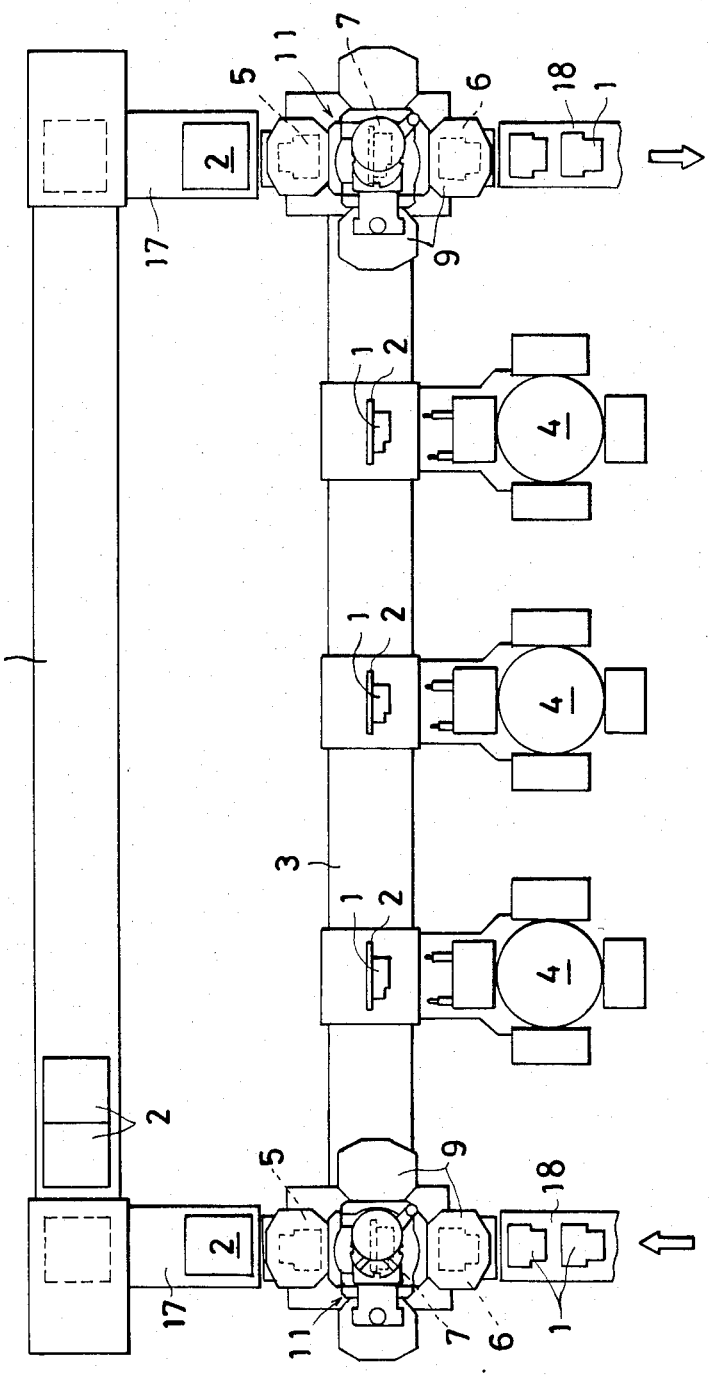
FIG. 1 is a top plan view of a transfer type working apparatus associated with this invention apparatus.

One embodying example of this invention will now be explained with reference to the accompanying drawings:

FIG. 1 shows a transfer type working apparatus having a plurality of replaceable ganghead type machine tools 4 disposed along a conveying line 3 for conveying a workpiece 1 with the workpiece 1 is attached to a pallet 2. A workpiece attaching and detaching apparatus of this invention is provided at the starting end (the left end in the drawings) of the conveying line 3 and the terminal end (the right end in the drawings).

Figure 2:
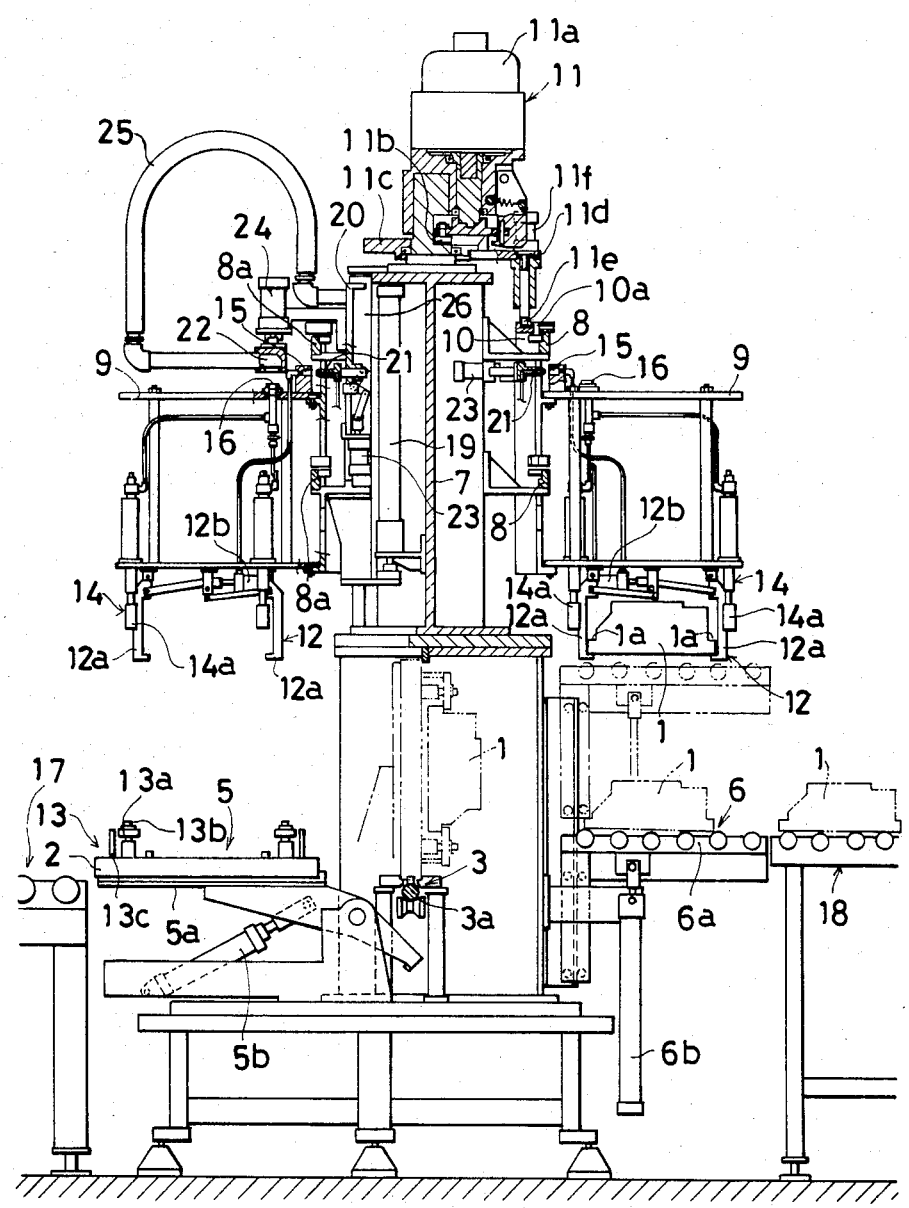
FIG. 2 is a sectional side view of one example of the invention apparatus.
Figure 3:
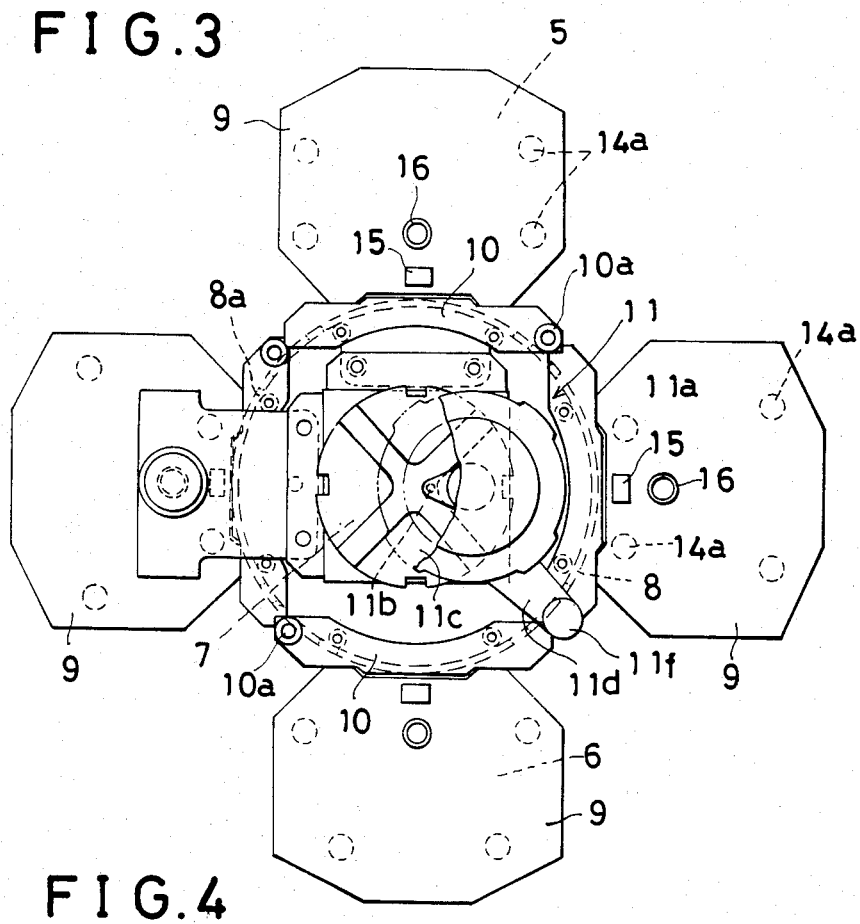
FIG. 3 is a top plan view thereof.

As shown clearly in FIGS. 2 and 3, the attaching and detaching apparatus comprises a supporting column 7 having on one side of the periphery thereof a first station 5 for a pallet 2 to be charged or discharged and on the other side thereof a second station 6 for a workpiece 2 to be charged or discharged. An annular rail means comprising a pair of upper and lower annular rails 8, 8 for instance, is attached to the periphery of an upper portion of the supporting column 7. Plural heads 9, for instance, four heads 9 which correspond respectively to various kinds of workpieces 1 are supported on the annular rails 8, 8 through respective frame bases 10 so that by operation of an index means 11 provided on the top portion of the supporting column 7, any desired one of the heads 9 may be selected and be moved between a first working position located above the first station 5 and a second working position located above the second station 6.

More in detail, the index means 11 comprises a Geneva pin 11b driven by an electric motor 11a, a Geneva motor type index table 11c engaged with the Geneva pin 11b, and an engaging pin 11e provided on a forward end portion of an arm 11d protruding from the table 11c. The engaging pin 11e is movable by a cylinder 11f to be inserted into and removed from a pin opening 10a made in a top surface of each frame base 10. Thus, the index table 11c is turned and the engaging pin 11e is engaged with the pin opening 10a of the frame base 10 having a predetermined one of the heads 9, and then the table 11c is turned and thereby the head 9 is moved to one of the working positions and further to the other thereof.

Each of the heads 9 is provided with both a holding means 12 for holding the workpiece 1 and a fastening and unfastening means 14 for a fastening means 13 provided on the pallet 2, so that, at the time of movement of each head 9 between the foregoing two working positions, a transfer of the workpiece 1 between the first station 5 and the second station 6 can be carried out by holding the workpiece 1 by the holding means 12 and also the fastening means 13 can be fastened or unfastened by the fastening-and-unfastening means 14 at the first station 5.

The holding means 12 comprises plural clamp members 12a for holding the workpiece 1 and an air cylinder 12b for opening and closing those clamp members 12a. The clamp members 12a are arranged to be in an ordinarily closed condition, and be opened if the cylinder 12b is operated by an air supply from a first air supply connected to the cylinder 12b.

Figure 4:
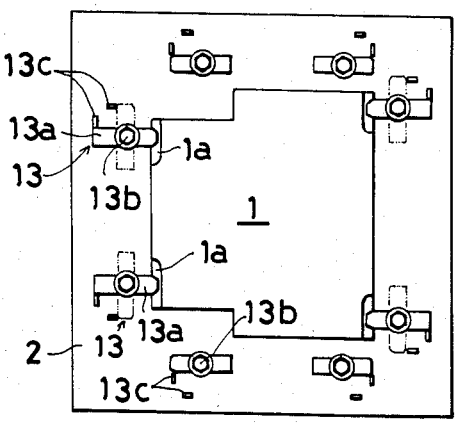
FIG. 4 is a top plan view of a pallet.

The fastening means 13 comprises, as shown clearly in FIGS. 2 and 4, a setting member 13a which is to be brought into engagement with a stepped engaging portion 1a of the workpiece 1 and a fastening bolt 13b thereof, so that when the fastening bolt 13b is turned in its fastening direction, the setting member 13a is turned, in conjunction with the turning of the bolt 13b, from its disengaging position to its engaging position at which it is brought into engagement with the stepped engaging portion 1a and is further brought into pressure contact with the stepped portion 1a. In order to meet the fastening of any one of different kinds of workpieces 1 which are different from each other in disposition of their stepped portions 1a formed therein, each group of the fastening means 13 corresponding to each disposition of the stepped portion 1a are disposed on each pallet 2, so that any desired one of the workpieces 1 may be attached to any desired pallet by a group of fastening means 13 corresponding to that kind of the workpiece 1. Numeral 13c denotes a stopper for each setting member 13a.

Each fastening-and-unfastening means 14 comprises plural air-driven type nut runners 14a which are to be brought into engagement with the fastening bolts 13b of the group of fastening means 13 corresponding to a certain kind one of the workpieces 1 of which respective corresponding heads 9 take in charge, so that each nut runner 14a may be turned by an air supply from a second air supply opening 16 provided in an upper portion of the head 9 and thereby fastening or unfastening of each fastening bolt 13b may be carried out.

Referring to the drawings, respective conveyors 17, 18 for the pallet 2 and for the workpiece 1 are provided adjacent, respectively, to the first station 5 and the second station 6. In this example, a receiving base 6a provided at the second station 6 is arranged to be moveable upwards and downwards by a cylinder 6b between its lowered position for effecting a transfer of the workpiece 1 between the base 6a and the conveyor 18 for conveying the workpiece 1 and its elevated position for effecting a transfer of the workpiece 1 between the same and the head 9 located at the second working position above the lowered position. A receiving base 5a provided at the first station 5b between its upright position for effecting a transfer of the pallet 2 having the workpiece attached thereto in its upright posture above a transfer bar 3a provided on an end portion of the conveying line 3, and its laid down position for effecting a transfer of the pallet 2 between the base 5a and the conveyor 17 for conveying the pallet 2. Additionally, the head 9 located at the first working position located above the first station 5 is arranged to be moveable upwards and downwards so that at its lowered position, a transfer of the workpiece 1 between the head 9 and the pallet 2 positioned at the first station 5, and a fastening or unfastening operation of the fastening means 13 may be carried out.

More in detail, such parts of the annular rails 8, 8 that correspond to the first working position is composed of elevating rails 8a, 8a attached to an elevating base 20 arranged to be moveable upwards and downwards by a cylinder 19 so that in accordance with upward and downward movements of the elevating rails 8a, 8a, the head 9 mounted thereon may be moved upwards and downwards.

Referring to the drawings first and second connectors 21, 22 for being connected to the first and second air supply openings 15, 16 respectively, are provided on the upper portion of the head 9. A pair of the first connectors 21, 22 are provided on that portion of the supporting column 7 corresponding to the second working position and on the elevating base 20 free to be attached to and detached from each first air supply opening 15 by respective cylinders 23. The second connector 22 is provided on the elevating base 20 free to be attached to and detached from the second air supply opening 16 by a cylinder 24.

Referring to the drawings, an air hose 25 is connected to each of the air connectors 21, 22, and a guide bar 26 is provided from the elevating base 20.

Next, the operation of this invention in a case where the same is used for attaching the workpiece 1 to the pallet at the starting end of the conveying line 3 will be explained as follows:

First, the receiving base 5a of the first station 5 is supplied with the pallet 2 from the conveyor 17 and the receiving base 6a of the second station 6 is supplied with the workpiece 1 from conveyor 18. The head 9 meeting, that is, corresponding to the workpiece 1 is moved to the second working position by the index means 11. The receiving base 6a at the second station 6 is elevated, and in this case the first air connector 21 is connected to the first air supply opening 15 and thereby the clamp members 12a of the holding means 12 are opened. When the receiving base 6a is elevated to the predetermined position, the first air connector 21 is disconnected from the first air supply opening 15, and the clamp members 12a are thereby closed to hold the workpiece 1 on the receiving base 6a by the closing operation thereof and are brought into the condition shown in FIG. 2.

Figure 5:
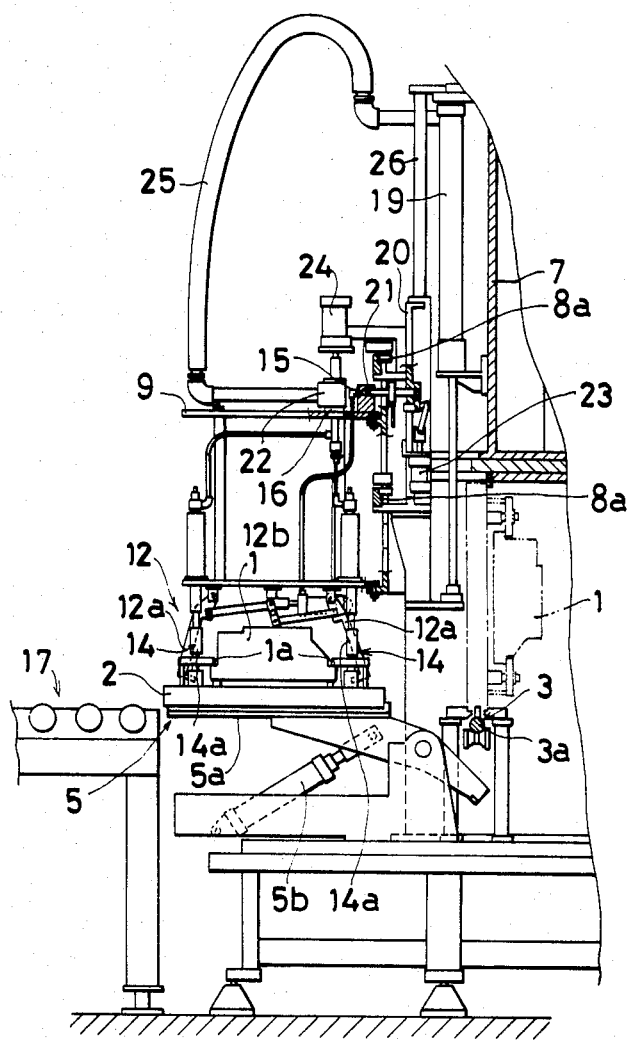
FIG. 5 is a sectional side view of an important portion of the foregoing example of this invention apparatus for explaining the operation thereof.

The head 9 is then moved to the first working position by the index means 11, and thereafter lowered together with the elevating rails 8a, 8a by lowering of the elevating base 20. When the same reaches the predetermined lowered position as shown in FIG. 5, the first and second air connectors 21, 22 are connected respectively to the first and second air supply openings 15, 16. The clamp members 12a are thereby opened for placing the workpiece 1 on the pallet 2 and at the same time each nut runner 14a of the fastening-and-unfastening means 14 is turned. Consequently, each predetermined fastening means 13 meeting the workpiece 1 is fastened as mentioned before, and the workpiece 1 is fixed, that is, attached to the pallet 2.

Thereafter, the head 9 is elevated by the elevating base 20, and the respective air connector 21, 22 are disconnected from the respective air supply openings 15, 16. The head 9 is turned by the index means 11. A predetermined head 9 meeting the workpiece 1 next introduced into the second station 6 is moved to the second working position. During the above operation, the receiving base 5a at the first station 5 is raised to its upright position. The pallet 2 having the workpiece 1 attached thereto is brought into engagement with the transfer bar 3a. Thereafter the receiving base 5a is returned to its laid down position and is then supplied with a new pallet 2.

By repeating the foregoing operations, each workpiece 1 is attached to each pallet 2.

The attaching and detaching apparatus of this invention provided at the terminal end of the conveying line 3 is operated in the order reverse to the above. Namely, the pallet 2 with the workpiece 1 conveyed by the transfer bar 3a is transferred to the receiving base 5a by upwardly and downwardly movements of the receiving base 5a. The head 9 corresponding to the workpiece 1 is moved to the first working position and is lowered. Unfastening of the fastening means 13 by the fastening-and-unfastening means 14 and holding of the workpiece 1 by the holding means 12 are carried out. Then, the head 9 is elevated and is moved to the second working position, and is caused by opening the holding means 12 to place the workpiece 1 on the receiving base 6a through the elevating and lowering movements of the receiving base 6a at the second station 6. The workpiece 1 is discharged from the receiving base 6a to the conveyor 18 connected thereto.

The pallet 2 from which the workpiece 1 has been detached is discharged from the receiving base 5a at the first station 5 to the conveyor 17 connected thereto, and thereafter is returned through a circulation passage 27 to the conveyor 17 connected to the foregoing attaching and detaching apparatus for workpiece located at the initial end of the conveyor 3.

In the foregoing example, the respective heads 9 can comprise differently constructed ones corresponding to respective different kinds of workpieces 1. However, in a case where the workpieces 1 are all of the same kind, the respective heads 9 all have the same construction. In this case, the working efficiency can be further improved by the way that the transfer operation of the workpiece 1 at the second working position is carried out during the time of operation at the first working station.

Thus, according to this invention, each of plural heads supported on an annular rail means is provided with both a holding means for a workpiece and a fastening and unfastening means for a fastening means. The heads are arranged so that any desired one thereof may be selected and be moved between its first working position located in opposite to a first station for a pallet to be charged or discharged and its second working position located in opposite to a second station for a piece to be charged or discharged. In this manner, operations can be carried out in sequence by the single common head wherein the workpiece is held by the holding means and is moved from one of the two stations to another thereof and the fastening means provided on the pallet is moved to fasten or unfasten the pallet by the fastening-and-unfastening means. This results in improvement in the working efficiency and elimination of waiting time as required for the conventional apparatus wherein the transfer means for a workpiece and the fastening-and-unfastening means for a fastening means are provided separately one from another. Additionally, if the apparatus is arranged so that the respective heads are constructed as different types corresponding respectively to different kinds of workpieces and the head corresponding to the workpieces is selected and operated, the same can comply with any change in kind of the workpiece. Thus, the foregoing inconveniences in the conventional apparatus can be surely eliminated.

It is readily apparent that the above-described workpiece attaching and detaching apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A workpiece attaching and detaching apparatus for attaching a workpiece to a pallet by fastening a fastening means provided on the pallet or detaching the workpiece from the pallet by unfastening the fastening means, characterized in that the apparatus comprises a supporting column having on one side of the periphery thereof a first station for a pallet to be charged or discharged and on another side thereof a second station for a workpiece to be charged or discharged, an annular rail means attached to the supporting column so as to surround the same, plural heads supported on the annular rail means, and an index means for selecting any desired one of the heads and moving the selected one between its first working position located opposite to the first station and its second working position located opposite to the second station, each of the heads being provided with both a holding means for holding the workpiece and a fastening-and-unfastening means for the foregoing fastening means.

2. The apparatus of claim 1, provided at the starting end portion of a conveying line for conveying the workpiece under the condition that the workpiece is attached to the pallet.

3. The apparatus of claim 1, provided at the terminal end portion of the conveying line for conveying the working piece under the condition that the workpiece is attached to the pallet.

4. The apparatus of claim 1, wherein the index means comprises a Geneva pin driven by an electric motor, a Geneva gear type index table engaged with the Geneva pin, an engaging pin provided on a forward end position of an arm protruding from the index table, and an air cylinder for moving the engaging pin.

5. The apparatus of claim 1, wherein the holding means comprises plural clamp members for holding the workpiece and an air cylinder for opening and closing the clamp members.

6. The apparatus of claim 1, wherein the fastening means comprises a setting member which is enagageable with a stepped engaging portion of the workpiece, and a fastening bolt thereof.

7. The apparatus of claim 1 wherein the fastening-and-unfastening means comprises an air-driven nut runner adapted to be engageable with the fastening bolt of the fastening means.

8. The apparatus of claim 6, wherein the fastening-and-unfastening means comprises an air-driven nut runner adapted to be engageable with the fastening bolt of the fastening means.

* * * * *